(12) United States Patent
Huang et al.

(10) Patent No.: US 10,673,911 B2
(45) Date of Patent: Jun. 2, 2020

(54) DISPLAYING REGIONS OF USER INTEREST IN SHARING SESSIONS

(71) Applicant: Cisco Technology, Inc., San Jose, CA (US)

(72) Inventors: Haihua Huang, Suzhou (CN); Jun Xiao, Suzhou (CN); Kang Xiao, Suzhou (CN); Jian Zhang, Suzhou (CN); Yuan Wu, Suzhou (CN); Qian Wang, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 751 days.

(21) Appl. No.: 15/098,675

(22) Filed: Apr. 14, 2016

(65) Prior Publication Data

US 2016/0234269 A1    Aug. 11, 2016

Related U.S. Application Data (63) Continuation of application No. 14/264,573, filed on Apr. 29, 2014, now Pat. No. 9,342,267.

(51) Int. Cl.
*H04L 29/06* (2006.01)
*G06F 3/14* (2006.01)

(52) U.S. Cl.
CPC ........ *H04L 65/4015* (2013.01); *G06F 3/1462* (2013.01); *H04L 65/4038* (2013.01); *H04L 65/602* (2013.01); *G09G 2340/045* (2013.01); *G09G 2340/12* (2013.01)

(58) Field of Classification Search
CPC ............... H04L 65/602; H04L 65/4015; H04L 65/4038; G06F 3/1462

USPC .......................................................... 709/205
See application file for complete search history.

(56) References Cited

U.S. PATENT DOCUMENTS

| | | | |
|---|---|---|---|
| 6,924,822 B2 | 8/2005 | Card et al. | |
| 8,004,540 B1 | 8/2011 | Munter et al. | |
| 8,185,828 B2 | 5/2012 | Liu et al. | |
| 8,516,374 B2 | 8/2013 | Fleischman et al. | |
| 8,581,956 B2 | 11/2013 | Robinson et al. | |
| 9,098,503 B1 * | 8/2015 | Johnson | G06F 16/40 |
| 2006/0010392 A1 | 1/2006 | Noel et al. | |

(Continued)

FOREIGN PATENT DOCUMENTS

EP    2879044 A1    6/2015

OTHER PUBLICATIONS

Freedom Scientific, Inc., MAGic® Quick Start Guide, retrieved from http://www.freedomscientific.com/products/low-vision/MAGic-screen-magnification-software.asp, on Aug. 19, 2013, 38 pages.

(Continued)

*Primary Examiner* — James E Springer
*Assistant Examiner* — Patrick F Ngankam
(74) *Attorney, Agent, or Firm* — Edell, Shapiro & Finnan, LLC (57) ABSTRACT

A meeting server facilitates an online conference session among a presenter device and a plurality of attendee devices, including a display of shared image data from the presenter device. The meeting server transmits a message representing combined user interest in areas of the shared image data. Based on the message from the meeting server, the presenter device and the attendee devices display a representation of the combined user interest.

20 Claims, 11 Drawing Sheets

(56) References Cited

U.S. PATENT DOCUMENTS

| | | | |
|---|---|---|---|
| 2006/0208926 A1* | 9/2006 | Poor | G01C 21/00 |
| | | | 340/995.1 |
| 2012/0102110 A1* | 4/2012 | Salesky | G06F 3/1415 |
| | | | 709/204 |
| 2012/0274736 A1* | 11/2012 | Robinson | H04N 7/15 |
| | | | 348/14.16 |
| 2012/0293606 A1* | 11/2012 | Watson | H04N 5/232 |
| | | | 348/14.16 |
| 2013/0191452 A1* | 7/2013 | Beerse | H04L 65/403 |
| | | | 709/204 |
| 2013/0219012 A1 | 8/2013 | Suresh et al. | |
| 2013/0305167 A1* | 11/2013 | Bastide | H04L 65/1069 |
| | | | 715/753 |
| 2013/0328746 A1 | 12/2013 | Fujita et al. | |
| 2014/0063177 A1* | 3/2014 | Tian | H04N 7/15 |
| | | | 348/14.07 |
| 2014/0092006 A1* | 4/2014 | Boelter | G06F 3/013 |
| | | | 345/156 |
| 2015/0309766 A1 | 10/2015 | Huang et al. | |

OTHER PUBLICATIONS

Freedom Scientific, Inc., MAGic® Screen Magnification Software Flyer, retrieved from http://www.freedomscientific.com/products/low-vision/MAGic-screen-magnification-software.asp, on Aug. 19, 2013, 2 pages.

\* cited by examiner

FIG.11 ent application Ser. No. 14/264,573, entitled "Displaying Regions of
DISPLAYING REGIONS OF USER INTEREST IN SHARING SESSIONS

CROSS REFERENCE TO RELATED APPLICATIONS

The application is a continuation of U.S. patent application Ser. No. 14/264,573, entitled "Displaying Regions of User Interest in Sharing Sessions," filed on Apr. 29, 2014, the entirety of which is incorporated herein by reference.

TECHNICAL FIELD

The present disclosure relates to online conference sessions.

BACKGROUND

Online conference sessions allow participants from around the world to communicate and share ideas. With the increasing ubiquity and capability of mobile devices, users may join an online conference session using devices of varying screen size and resolution. If a user with a large screen shares his or her desktop or an application that covers a large area, users with smaller screen sizes/resolutions may not be able to view the entire shared content at a legible size in the smaller screen size. A user with a smaller screen size will typically zoom in to view shared content at a legible size, and may only be viewing a portion of the shared content.

DESCRIPTION OF EXAMPLE EMBODIMENTS

Overview

In accordance with one aspect, a meeting server facilitates an online conference session among a presenter device and a plurality of attendee devices, including a display of shared image data from the presenter device. The meeting server receives a plurality of indications each associated with a corresponding portion of the shared image data displayed on each of the attendee devices. The plurality of indications are combined into a message representing user interest in areas of the shared image data, and the message is transmitted to the presenter device.

In accordance with another aspect, an online conference session among a plurality of attendee devices and a presenter device is joined. Image data is shared with the plurality of attendee devices from the presenter device in the online conference session. A message is received representing interest in areas of the shared image data. The message representing interest in areas of the shared image data is displayed.

In accordance with still another aspect, an online conference session among a plurality of attendee devices and a presenter device is joined. The online conference session includes shared image data from the presenter device. At least a portion of the shared image data is displayed at the presenter device. An indication of the displayed portion of the shared image data is transmitted from the presenter device. A message is received at the presenter device representing interest in at least one area of the shared image data.

Example Embodiments

Figure 1:
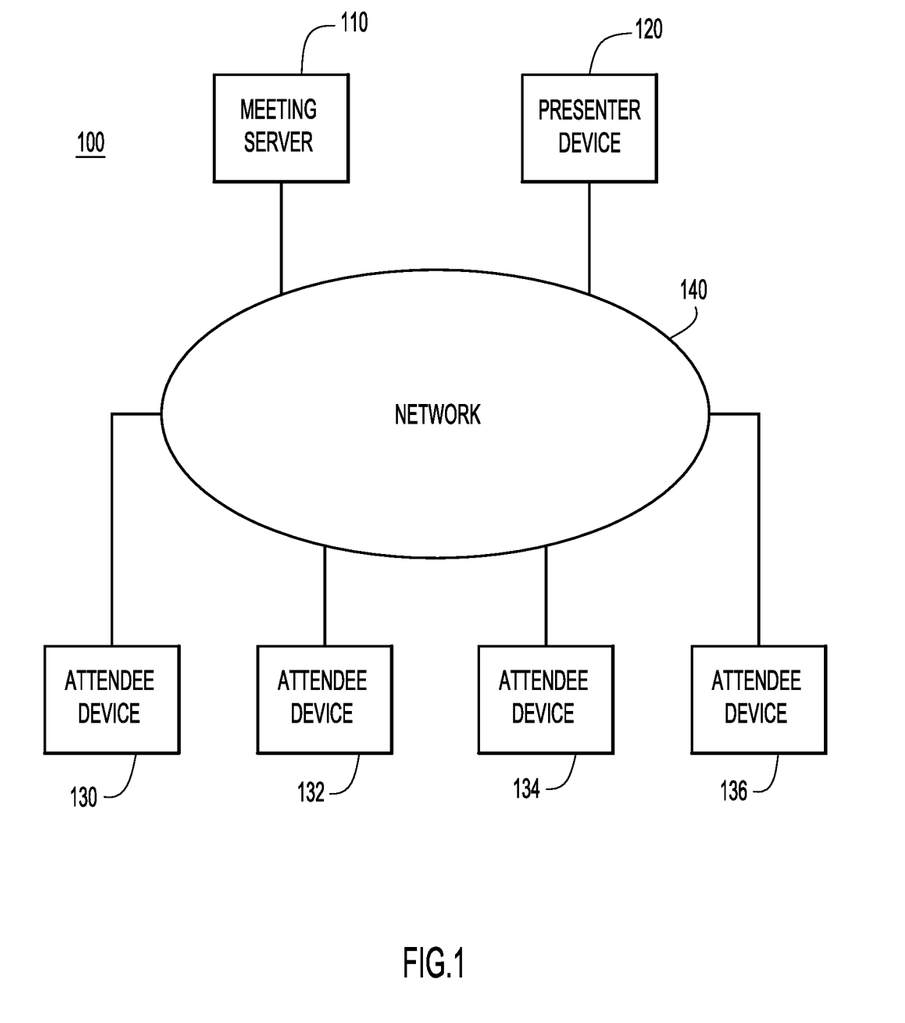
FIG. 1 is a block diagram of a system of devices configured to participate in an online conference session according to an example embodiment.

Referring to FIG. 1, an online conference system 100 is shown that enables a meeting server 110 to facilitate an online conference session (e.g., a web meeting) in which users can share voice, video, chat, and/or other types of data communication through presenter device 120 and attendee devices 130, 132, 134, and 136 over network 140. The online conference session may further comprise desktop sharing and/or application sharing. Only four attendee devices are shown in FIG. 1, but any number of attendee devices may be included in system 100. Additionally, the presenter device 120 and attendee devices 130, 132, 134, and 136 may have the same capabilities in the online conference session, with the exception that the presenter device 120 is designated, during some period of time, to share content with the attendee devices in the online conference session. The designation of "presenter device" may change throughout the online conference session, and is used herein merely to specify which of the participant devices is currently sharing content. In general, presenter device 120 and attendee devices 130, 132, 134, and 136 may take a variety of forms, including a desktop computer, laptop computer, mobile/cellular phone (e.g., Smartphone), tablet computer, Internet telephone, etc. Network 140 may be any type of network (e.g., any combination of Internet, intranet, local area network (LAN), wide area network (WAN), wired network, wireless network, etc.) that connects computing devices, e.g., presenter device 120 and attendee devices 130, 132, 134, and 136. Meeting server 110 may be used, for example, to mediate transactions between presenter device 120 and attendee devices 130, 132, 134, and 136. Server 110 may also perform caching or other time/bandwidth saving techniques. It should be understood that in a web-based conference system, each device may communicate with the server 110 through a browser application having one or more plug-ins that enable the web-based meeting experience, and allow for the transmission of data to the meeting server 110, and the reception of data from the meeting server during a conference/meeting session.

Figure 2:
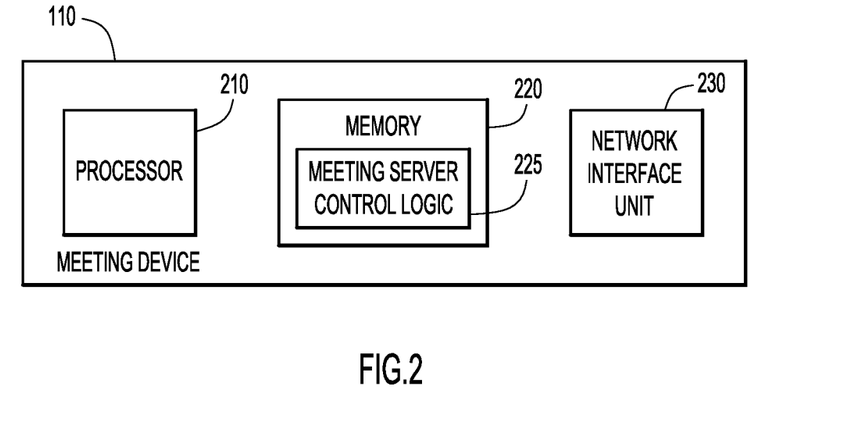
FIG. 2 is a block diagram of a meeting server configured to facilitate the online conference session according to an example embodiment.

Referring now to FIG. 2, a simplified block diagram of meeting server 110 is shown. Server 110 includes a processor 210 to process instructions relevant to an online conference session supported by the system 100, memory 220 to store a variety of data and software instructions (e.g., audio, video, control data, etc.), including meeting server control logic/software 225. The server also includes a network interface unit (e.g., card) 230 that enables network communications so that the server 110 can communicate with other devices, e.g., the presenter and attendee devices, as explained in further detail hereinafter. Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software (e.g., the meeting server control logic/software 225) comprising computer executable instructions and when the software is executed (by the processor 210) it is operable to perform the operations described herein.

Figure 3:
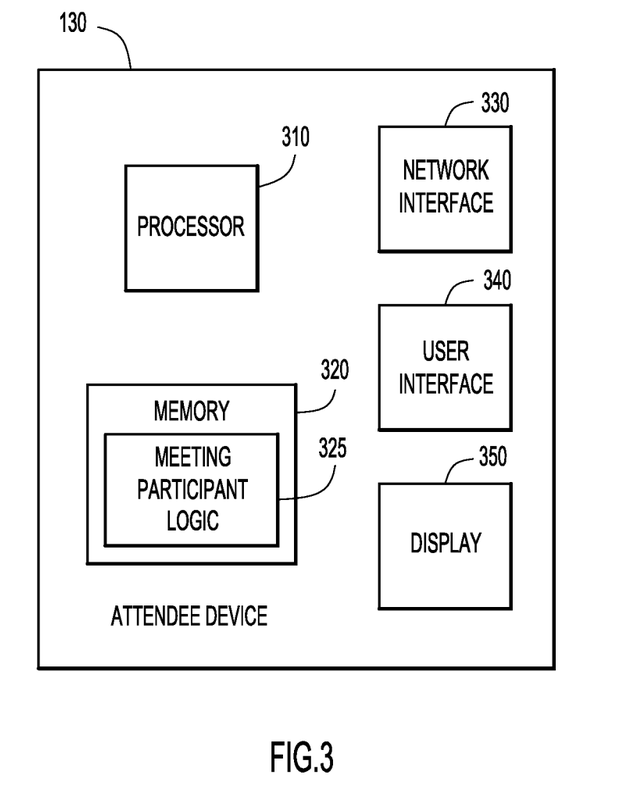
FIG. 3 is a block diagram of a user device configured to join the online conference session according to an example embodiment.

Referring now to FIG. 3, a simplified block diagram of an example device, e.g., presenter device or attendee device is shown. For simplicity, FIG. 3 shows a block diagram of one of the attendee devices, generically referred or labeled with reference numeral 130. The device includes a processor 310 to process instructions relevant to a conference/meeting session supported by the system 100, memory 320 to store a variety of data (e.g., display data for shared documents, applications, etc.) and software instructions (e.g., meeting participant logic 325 with instructions for a browser application to enable the connectivity and display of data during a conference session, etc.). The device also includes a network interface unit (e.g., card) 330 to communicate with other devices over network 140, and a user interface unit 340 to receive input from a user. The user interface unit 340 may be in the form of a keyboard, mouse and/or a touchscreen user interface to allow for a user of the attendee device to interface with the device. Device 130 also comprises a display 350 that can display data to a user, such as shared content associated with a conference session.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes described herein. Thus, in general, the memory 320 may comprise one or more tangible (non-transitory) computer readable storage media (e.g., a memory device) encoded with software comprising computer executable instructions and when the software is executed (by the processor 310) it is operable to perform the operations described herein.

In one example of an online conference session, a presenter device 120 shares content (e.g., presenter device's desktop, an application, a document, etc.) with all of the attendee devices. To share the content, the presenter device may capture image data of the content to be shared, and transmit the image data to the meeting server 110. The shared image data is then forwarded to each of the attendee devices, so that each of the attendee devices can display the shared content. For attendee devices with smaller screens relative to the shared image data, the user of the attendee device may zoom in to a particular area of the shared image data in order to focus on that area.

In order to allow a presenter to know which portions of a shared screen the attendee devices with small screens are focused on, a meeting server may collect statistics on the content on the displays of each of the attendee devices. The meeting server may then generate a graphical display, which is sent to the presenter device and displayed to the presenter. Some attendees may also desire to know what areas other attendees are focused on, and the meeting server may send the graphical display to at least one of the attendee devices as well. In another example, the meeting server may send a command to automatically direct attendee devices to specific areas of the shared content, such as the area of highest interest, to the rest of the attendees.

Figure 4:
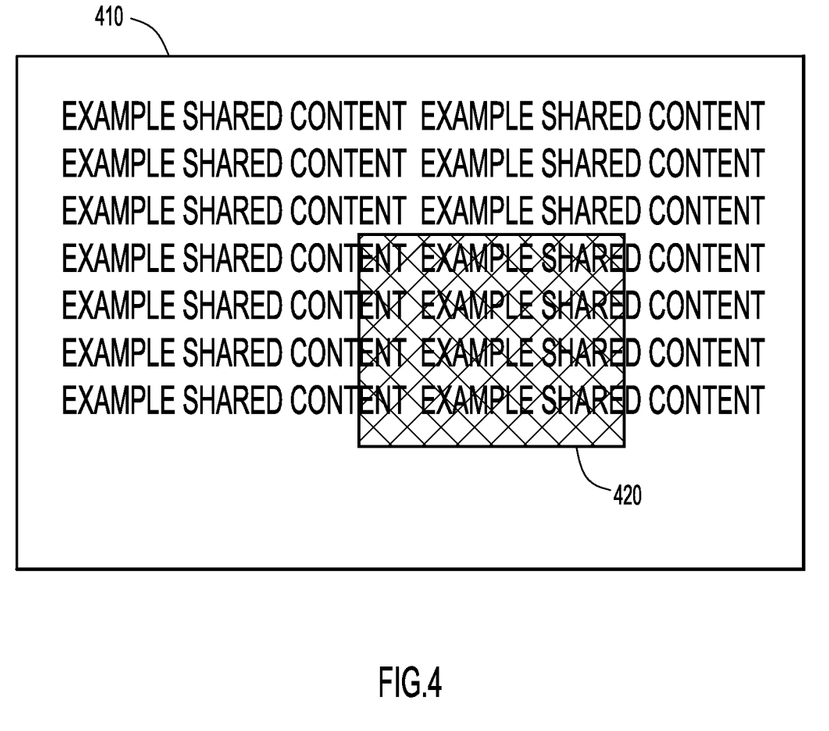
FIG. 4 is a diagram showing shared content and a portion of the shared content being viewed on a small screen according to an example embodiment.

Referring now to FIG. 4, a diagram shows an example of image content shared by the presenter device in an online conference session. Shared image data 410 is transmitted to meeting server 110 by presenter device 120. The meeting server 110 may then share the shared image data 410 with the attendee devices 130, 132, 134, and 136. If one of the attendee devices has a smaller screen, then that attendee device may zoom in to focus on one specific area shown by window 420.

Figure 5A:
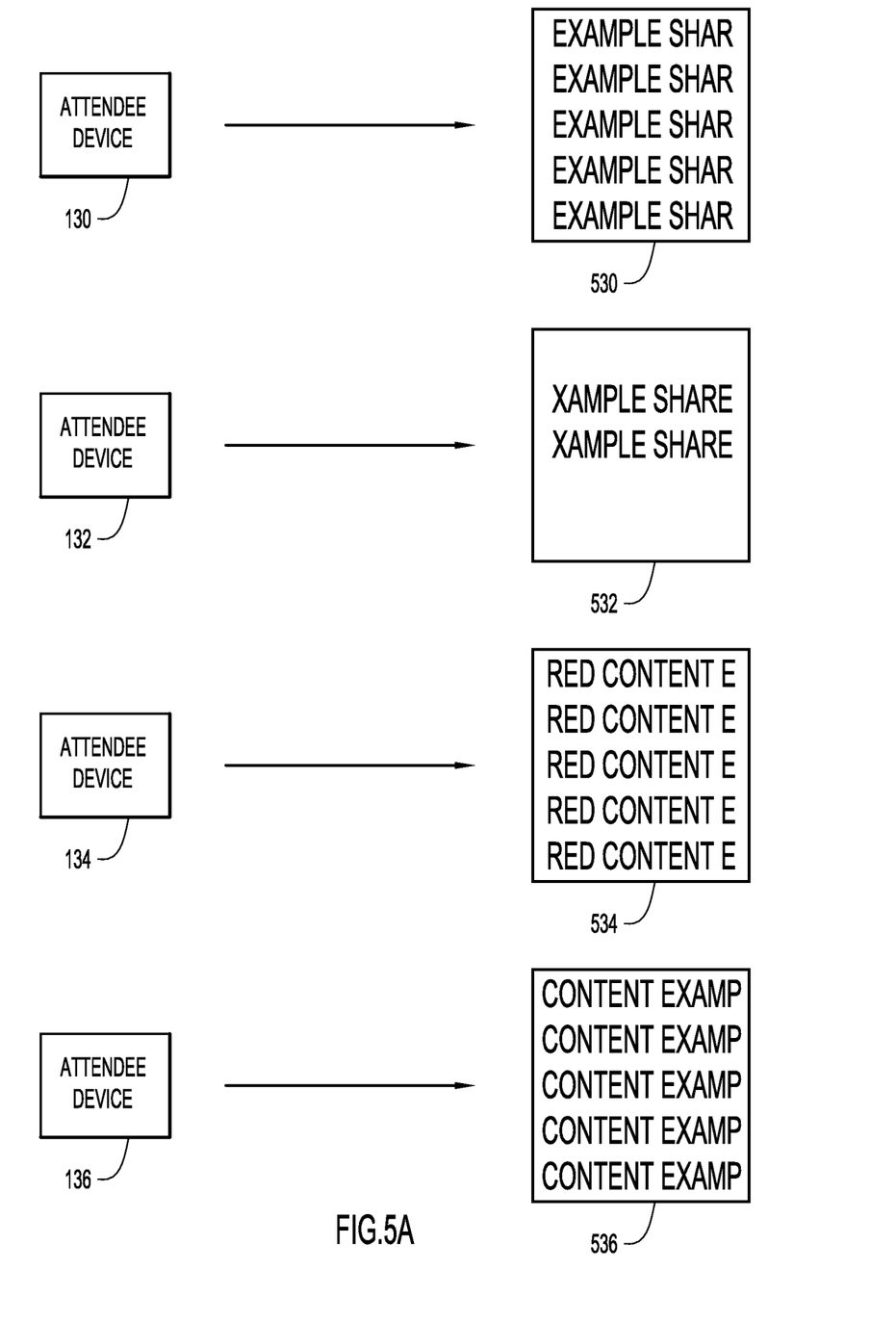
FIG. 5A is a block diagram showing four small screen devices and their respective views of the larger shared content according to an example embodiment.

Referring now to FIG. 5A, a diagram shows four attendee devices and the displays of their respective displays. Attendee devices 130, 132, 134, and 136 display areas 530, 532, 534, and 536 of the shared image data, respectively. In this example, attendee devices 130, 132, 134, and 136 each has a significantly smaller screen than the presenter device 120, but other attendee devices (not shown) may have larger screens that are able to display the entire shared image data 410. Additionally, each of the attendee devices 130, 132, 134, and 136 are shown with approximately equal screen size, but it is also envisioned that the screen sizes, resolutions, and magnification levels may vary between each of the attendee devices 130, 132, 134, and 136.

Figure 5B:
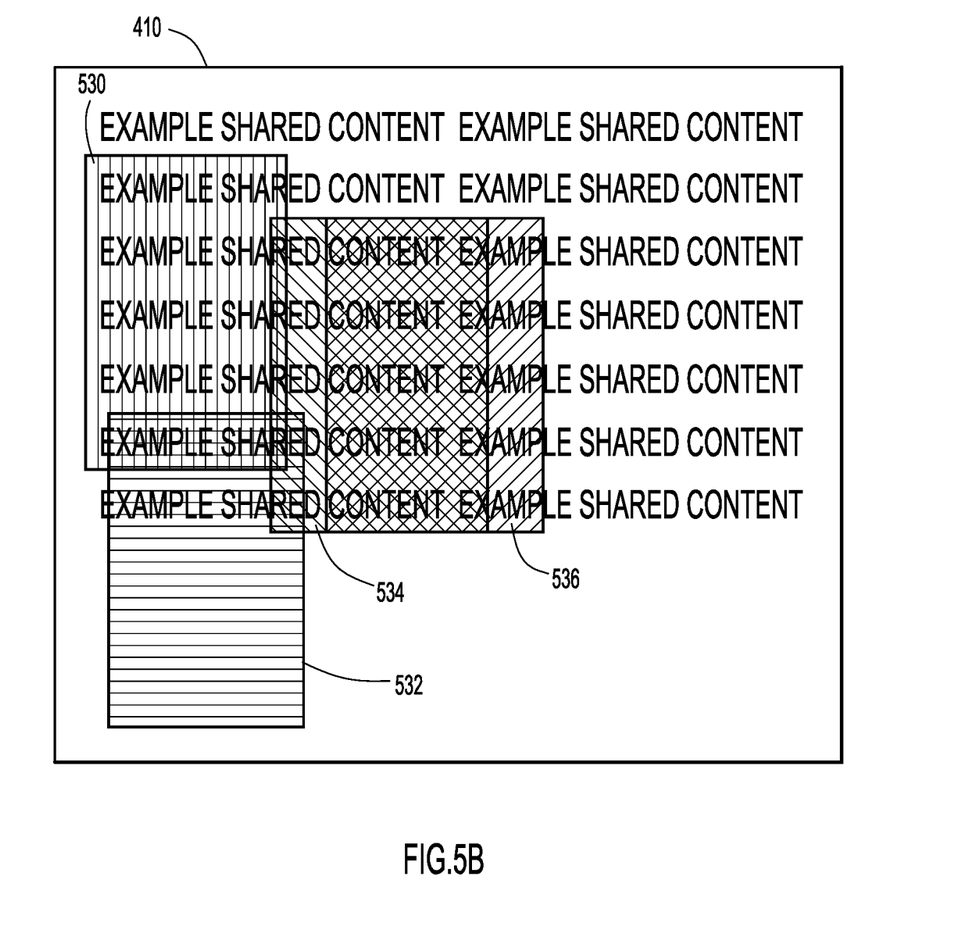
FIG. 5B is a diagram showing an example embodiment of the views of the four small screen devices overlapped on the larger shared content.

Referring now to FIG. 5B, a diagram shows the displayed areas of four attendee devices overlapped with the entire shared image data. Each of the display areas 530, 532, 534, and 536 cover a portion of shared image data 410. In this example, areas 530, 532, and 534 overlap each other only slightly, while areas 534 and 536 overlap significantly. A larger area of overlap may be more useful in determining the area of user interest (i.e., what area most attendees are interested in) than a smaller overlap. In one example, each of the attendee devices 130, 132, 134, and 136 sends coordinates of display areas 530, 532, 534, and 536, respectively, to the meeting server 110 so that the meeting server may determine the areas of user interest among the plurality of attendee devices. The coordinates of each area 530, 532, 534, and 536 may be, for example, x-y coordinates of two corners of each display area.

The attendee devices 130, 132, 134, and 136 may send additional information that may be relevant to determining the area of user interest, such as the amount of time an attendee device has been displaying the current display area, or whether a user input specified the current display area. For example, if an attendee device 130 has been displaying the same area 530 for a relatively long period of time, then the meeting server may conclude that the user is highly interested in area 530 and apply a higher weighting in determining the area of highest user interest. Alternatively, if attendee device 132 has displayed area 532 for an even longer period of time, the meeting server may conclude that the user of attendee device 132 is no longer paying attention, and apply a lower weighting to area 532 in determining the area of highest user interest.

Additionally, if the user of attendee device 134 manually magnified and scrolled to area 534, then the meeting server may conclude that the user is particularly interested in area 534, and therefore would apply a higher weighting to the area of interest 534. Further, a significant overlap in two or more areas of interest (e.g., the overlap between areas 534 and 536) may indicate that these two attendees are viewing essentially the same content, and that overlap may be weighted higher than an area of smaller overlap (e.g., the overlap between areas 530, 532, and 534) even though more attendee devices have indicated interest in that overlap area. In other words, a larger contiguous area of overlap between two areas of interest may be a greater indication of user interest than a smaller area of overlap between three areas of interest.

Figure 6:
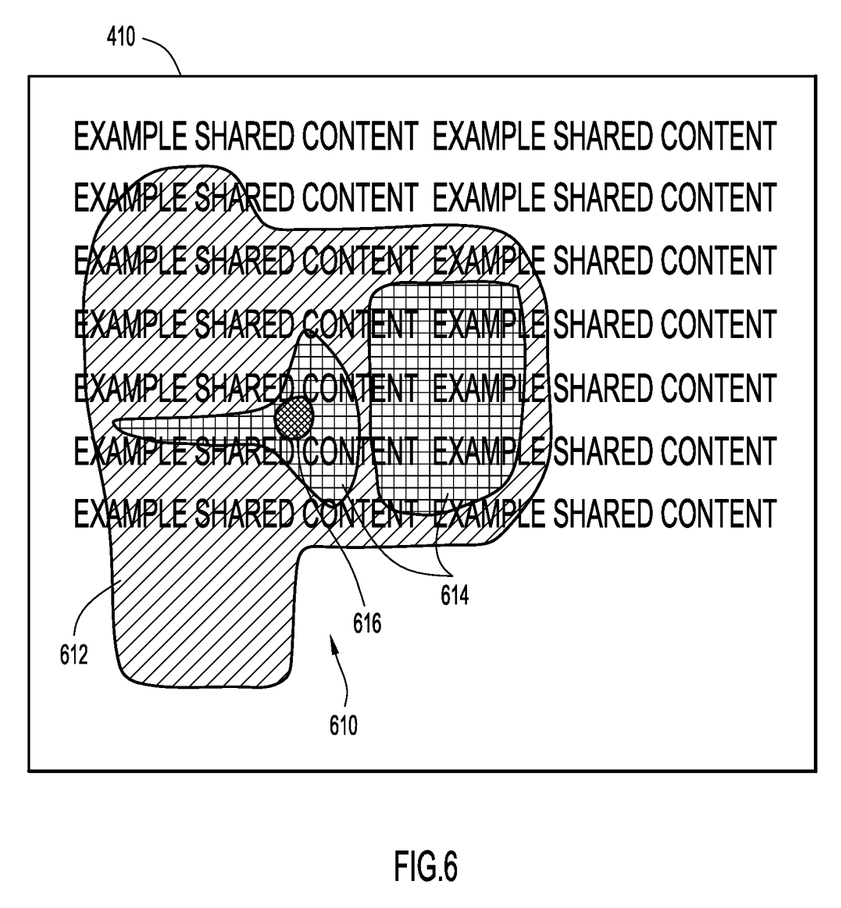
FIG. 6 is a diagram of an example embodiment showing a heatmap of user interest overlaid on the larger shared content.

Referring now to FIG. 6, one example of a graphical display of the statistics of attendee interest is shown. In this representation, a heatmap 610 is generated to display the interest of the attendees in specific areas of shared image content 410. Heatmap 610 comprises areas of low interest 612, areas of medium interest 614, and areas of high interest 616. Each of the areas of interest 612, 614, and 616 may be displayed using a different color, for example area 612 may be blue, area 614 may be green, and area 616 may be red. While only three levels of interest are shown in FIG. 6, in other examples, further levels of gradation may be included in heatmap 610. In the example displayed in FIG. 6, the heatmap 610 is displayed overlaid on the shared image content 410, but in other examples the heatmap 610 may be displayed without the shared image content 410.

The heatmap 610 may be generated by counting the number of attendee devices that are displaying each pixel of the shared image content 410, possibly modified by weighting factors (e.g., time, contiguous area, indications of user intent, etc.). The weighting may comprise multiplying the number of attendees viewing a pixel by the length of time each attendee has been viewing the pixel. In another example, the weighting may comprise, for each pixel in an area of contiguous overlap between two or more areas of interest, multiplying the total area of the contiguous overlap by the number of attendee devices displaying the overlapping areas of interest. This will have the effect of increasing the weight of larger overlap areas, even if there are fewer attendee devices contributing to the overlap areas.

After a value of user interest has been determined for each pixel coordinate, each value is converted to a color that represents the relative user interest in that particular pixel. In another example, heatmap 610 may be represented as a three-dimensional perspective elevation plot, with the value of user interest represented by the height of the plot at each pixel coordinate. The heatmap 610 may further be represented by any suitable means for displaying three dimensional data (pixel x-coordinate, pixel y-coordinate, user interest) on a two dimensional display.

Figure 7:
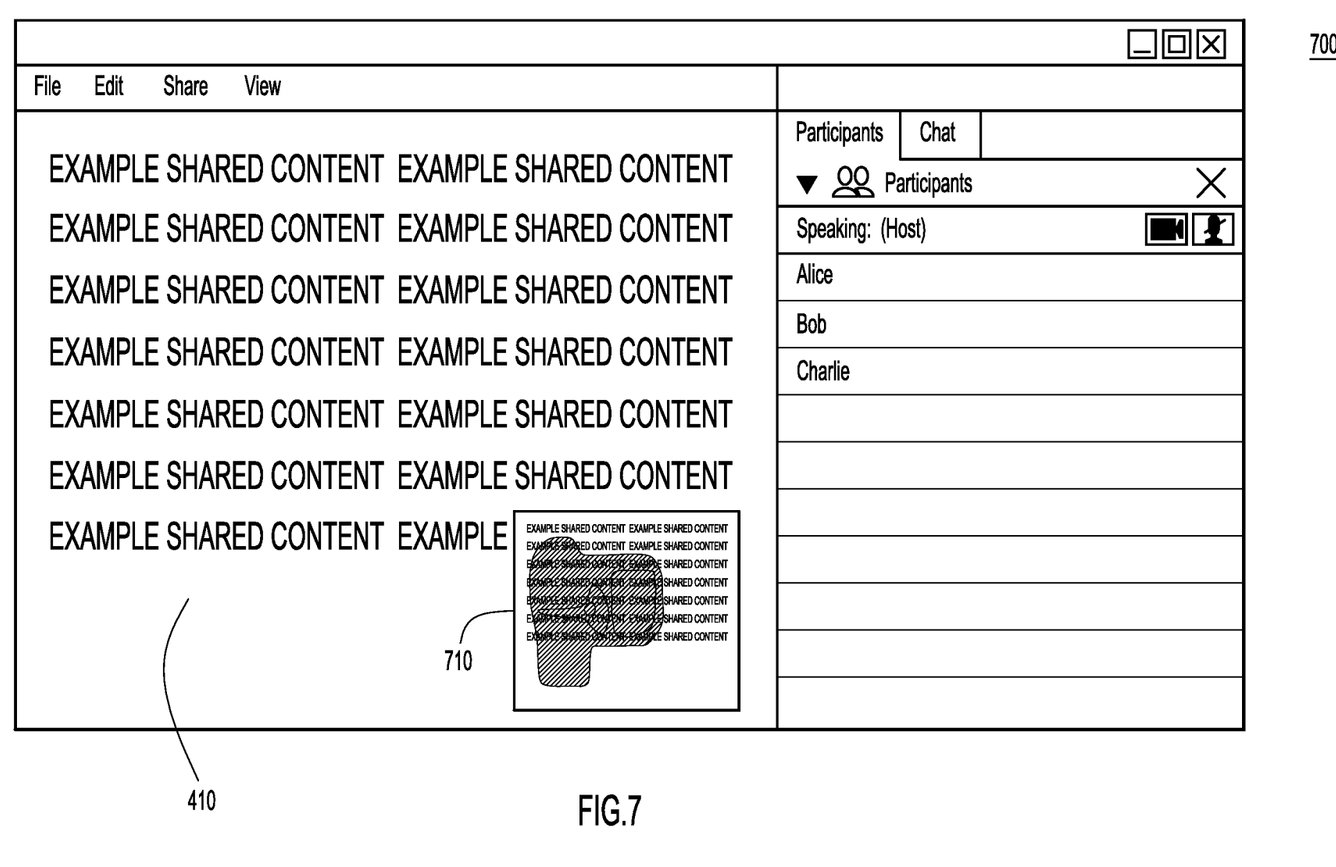
FIG. 7 is a simulated screenshot of the display on a presenter device that is sharing content, and a thumbnail of the heatmap of user interest according to an example embodiment.

Referring now to FIG. 7, a screenshot of the display on a presenter device including a thumbnail representation of the statistics of user interest is shown. Screenshot 700 comprises the user interface of the online conference session and includes the shared content image 410 with a thumbnail 710 inserted into a corner of the presenter device's display. The thumbnail 710 allows the presenter to quickly visualize the areas of the shared content that the attendees are interested in. The thumbnail 710 may include a color heatmap, a three-dimensional elevation plot, or any other method of displaying three dimensional data on a two dimensional display.

Figure 8:
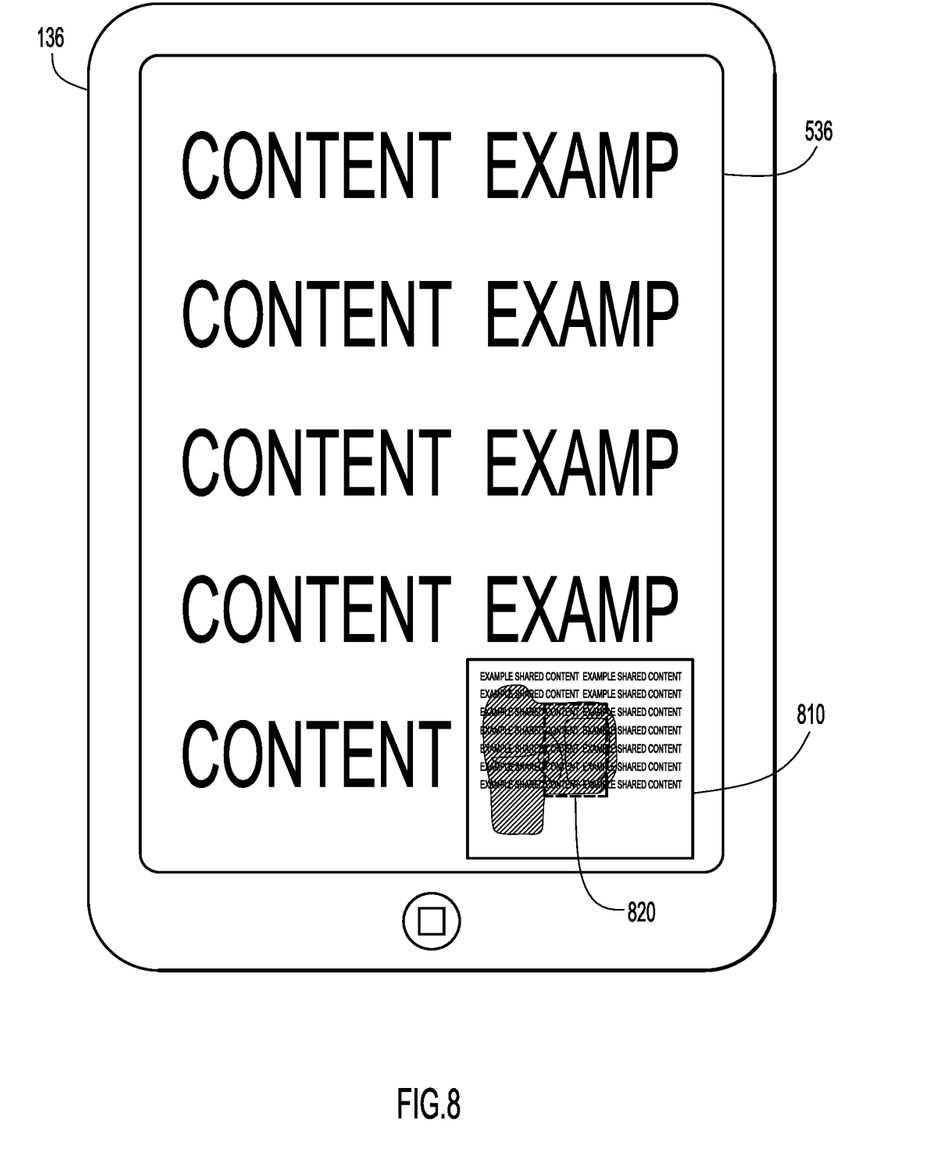
FIG. 8 is an example embodiment of a small screen attendee device with a thumbnail of the heatmap of user interest according to an example embodiment.

In some examples, the statistics on user interest may be sent to attendee devices as well as the presenter device 120. The distribution of the user statistics may be controlled by preferences set by one or more of the participants in an online conference session. Referring now to FIG. 8, a diagram of an attendee device displaying the user interest statistics is shown. Attendee device 136 displays area of interest 536 as part of the online conference session. Thumbnail image 810 is also displayed on the attendee device 136 to provide the attendee with a representation of the statistics of user interest in the shared content. Optionally, window 820 may indicate on thumbnail 810 which portion of the shared content is currently displayed as area 536. In other words, thumbnail image 810 provides a condensed view of shared content image 410, and window 820 shows the displayed area 536 in the context of the condensed view of shared content image 410.

Figure 9:
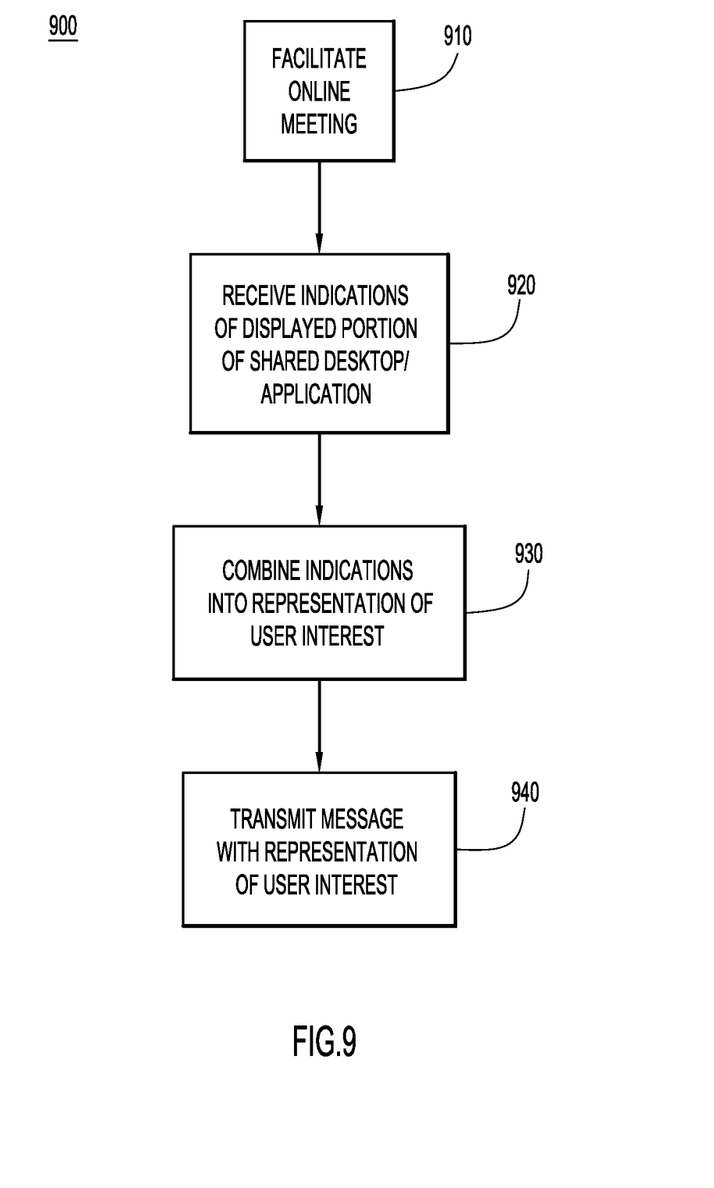
FIG. 9 is a process flow diagram for a meeting server determining the user interest according to an example embodiment.

Referring now to FIG. 9, an example process 900 for a meeting server distributing a representation of user interest in an online conference session is shown. In step 910, meeting server 110 facilitates an online conference session/meeting, including sharing image content of, e.g., a presenter device's desktop or a shared application. The meeting server 110 receives indications of the displayed portion of the shared image content at step 920. In step 930, the indications are combined into a representation of user interest, which is transmitted to the presenter device 120 and/or one or more attendee devices at step 940.

In one example, the meeting server 110 receives the indications of displayed portion of the shared content as part of facilitating the online conference session. In this way, the meeting server 110 may only transmit the portion of shared content image that will be displayed on the attendee device, conserving bandwidth. Alternatively, the entire shared content image may be transmitted to some or all of the attendee devices and each of the attendee device processes the shared content image to display only the requested portion.

In another example, the representation of user interest may comprise a heatmap, possibly overlaid on a thumbnail of the shared content image. The heatmap visually depicts the relative interest in each pixel of the shared image content. Alternatively, the representation of user interest may comprise a notification of a single area of highest user interest. The message sent with this representation may include a command to automatically zoom to the area of highest interest. In this example, some or all of the attendee devices may be directed to the area of highest interest and ensure that the attendee devices are viewing the same portion.

Figure 10:
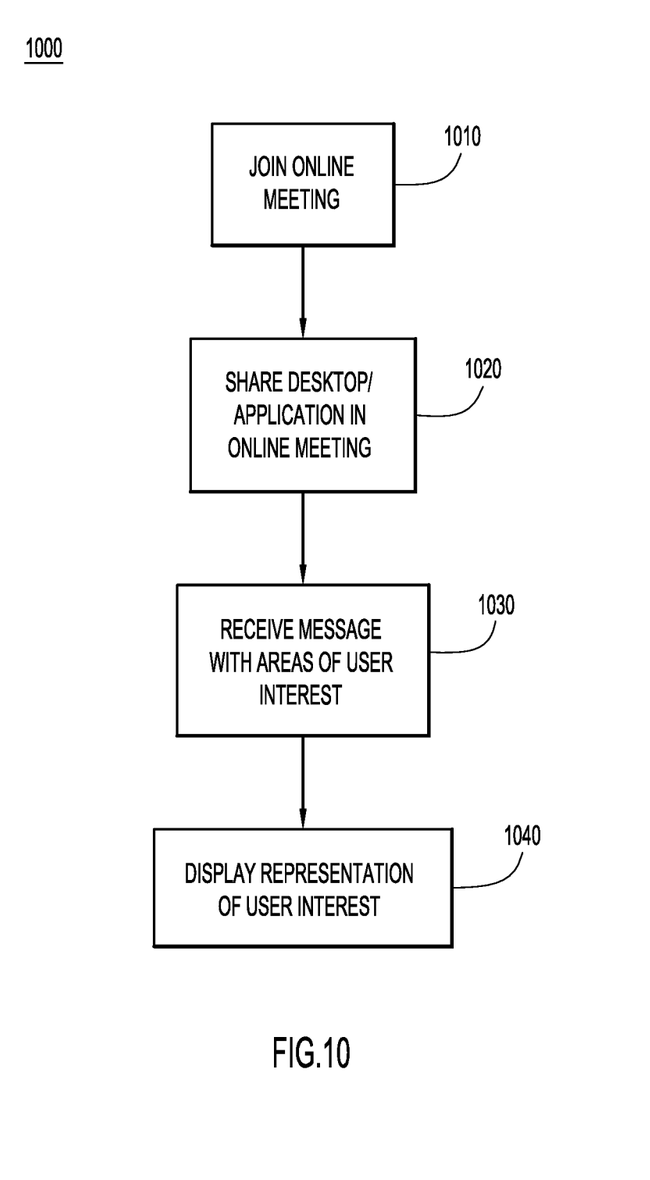
FIG. 10 is a process flow diagram for a presenter device displaying a representation of user interest according to an example embodiment.

Referring now to FIG. 10, an example process 1000 for a presenter device sharing content and receiving a representation of user interest in the shared content is shown. In step 1010, the presenter device 120 joins the online conference session/meeting. The presenter device shares, at step 1020, a content image with the attendee devices in the online conference session. The shared content may be, e.g., a desktop image or an image of a shared application. In step 1030, the presenter device receives a message with areas of user interest. The presenter device 120 displays the representation of user interest to the presenter at step 1040. The representation of user interest may comprise a heatmap, or an elevation plot, or any means of displaying three dimensional data on a two dimensional screen.

In one example, the online conference session is mediated by a meeting server, and the message with the areas of user interest may comprise the representation of user interest already calculated by the meeting server. Alternatively, the presenter device may receive a message with the areas of interest of each attendee device along with other weighting factors from the meeting server, and the representation of user interest may be calculated at the presenter device.

In another example, the presenter device may receive messages directly from each of the attendee devices in a peer-to-peer online conference session. These messages may include areas of interest for each attendee device, as well as other weighting factors that the presenter device may use in calculating the representation of user interest.

Figure 11:
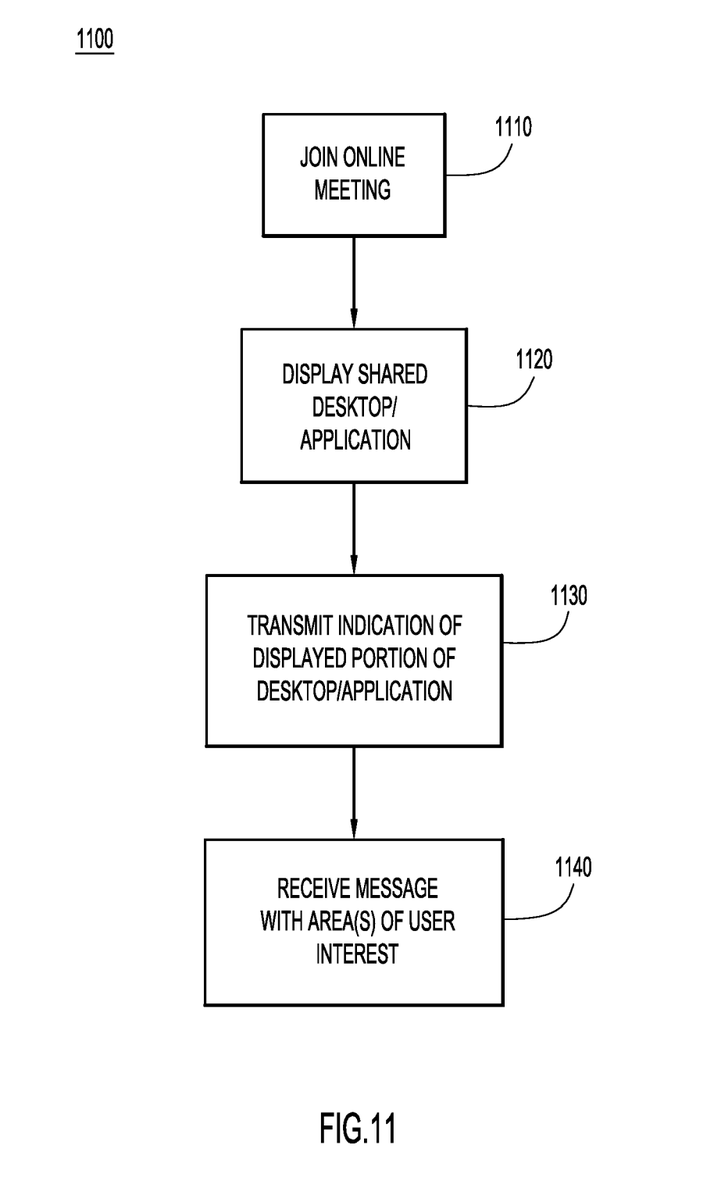
FIG. 11 is a process flow diagram for an attendee device receiving the areas of user interest in the shared content according to an example embodiment.

Referring now to FIG. 11, an example process 1100 is shown for an attendee device in an online conference session receiving information about the areas of interest of other attendee devices. In step 1110, the attendee device joins the online conference session/meeting. As part of the online conference session, the attendee device displays at least a portion of a shared content image at step 1120, which was shared by a presenter device. In step 1130, the attendee device transmits an indication of the portion of the shared content image that the attendee device is displaying. The attendee device may also transmit other weighting factors which may be used to determine the attendee's interest in the shared content image. In step 1140, the attendee device receives a message with at least one area of user interest. In one example the message comprises a heatmap that the attendee device may display to the attendee. In another example, the message may comprise a single area of highest user interest, and the attendee device may zoom to display the area of highest user interest, either manually or at the direction of the attendee.

In summary, the techniques presented herein provide for helping a presenter and/or attendees in an online conference session to know which areas of shared content are most interesting to the attendees. These techniques may become more valuable as mobile device participation in online conference sessions increases, since the smaller screens of mobile devices typically require an attendee to focus on a smaller portion of the shared content.

In one example, the techniques presented herein provide for a method implemented by a meeting server. The method includes facilitating an online conference session among a presenter device and a plurality of attendee devices. The online conference session includes a display of shared image data from the presenter device. The method further comprises receiving a plurality of indications each associated with a corresponding portion of the shared image data displayed on each of the attendee devices. The plurality of indications are combined into a message representing user interest in areas of the shared image data, and the message representing interest is transmitted to the presenter device.

In another example, the techniques presented herein provide for a method implemented by a presenter device. The method includes joining an online conference session among a plurality of attendee devices and the presenter device. The presenter device shares image data with the plurality of attendee devices in the online conference session. The presenter device receives a message representing interest in areas of shared image data, and displays the message representing interest in areas of the shared image data.

In a further example, the techniques presented herein provide for a method implemented by an attendee device. The method includes joining an online conference session among a plurality of attendee devices and a presenter device. The online conference session includes shared image data from the presenter device. The attendee device displays at least a portion of the shared image data and transmits an indication of the displayed portion of the shared image data. The attendee device receives a message representing interest in at least one area of the shared image data.

In yet another example, the techniques presented herein provide for a meeting server. The meeting server comprises a network interface unit and a processor. The network interface unit is configured to communicate data in an online conference session among a plurality of attendee devices and a presenter device. The processor is configured to share image data from the presenter device in the online conference session, and receive a plurality of indications via the network interface unit. Each of the indications is associated with a corresponding portion of the shared image data displayed on each of the plurality of attendee devices. The processor is further configured to combine the plurality of indications into a message representing user interest in areas of the shared image data, and transmit the message to the presenter device via the network interface unit.

The above description is intended by way of example only. Various modifications and structural changes may be made therein without departing from the scope of the concepts described herein and within the scope and range of equivalents of the claims.

What is claimed is:

1. A computer-implemented method comprising:
   at a particular participant device, joining an online conference session among a plurality of participant devices comprising a plurality of attendee devices and a presenter device, the online conference session including shared image data from the presenter device;
   displaying at least a portion of the shared image data on the particular participant device;
   receiving a message from a meeting server during the online conference session, the message representing a combined interest by the plurality of attendee devices in at least one area of the shared image data that is currently shared with the plurality of attendee devices, wherein the combined interest is generated at the meeting server based on respective interests comprising respective portions of the shared image data currently displayed at each respective attendee device of the plurality of attendee devices; and
   displaying a representation of the combined interest on the particular participant device during the online conference session.

2. The method of claim 1, wherein the representation of the combined interest comprises a heat map of pixels in the shared image data that represents a number of attendee devices displaying each of the pixels in the shared image.

3. The method of claim 2, wherein displaying the representation of the combined interest comprises overlaying the representation of the combined interest over the shared image data.

4. The method of claim 3, wherein displaying the representation of the combined interest comprises overlaying the representation of the combined interest over a thumbnail image of the shared image data.

5. The method of claim 1, wherein the message comprises coordinates defining an area of highest interest within the shared image data, and further comprising displaying the area of highest interest within the shared image data.

6. The method of claim 5, wherein displaying the area of highest interest comprises displaying a thumbnail image of the area of highest interest.

7. The method of claim 1, further comprising receiving a command to zoom to an area of highest interest within the shared image data, and zooming the displayed portion of the shared image data to match the area of highest interest.

8. An apparatus comprising:
a network interface unit configured to communicate data in an online conference session among a plurality of attendee devices and a presenter device through a meeting server;
a display configured to display shared image data from the presenter device in the online conference session; and
a processor configured to:
join the online conference session as one of the plurality of attendee devices;
cause the display to show at least a portion of the shared image data;
receive, via the network interface unit, a message from the meeting server during the online conference session, the message representing a combined interest by the plurality of attendee devices in at least one area of the shared image data that is currently shared with the plurality of attendee devices, wherein the combined interest is generated at the meeting server based on respective interest comprising respective portions of the shared image data currently displayed at each respective attendee device of the plurality of attendee devices; and
cause the display to display a representation of the combined interest during the online conference session.

9. The apparatus of claim 8, wherein the representation of the combined interest comprises a heat map of pixels in the shared image data that represents a number of attendee devices displaying each of the pixels in the shared image.

10. The apparatus of claim 9, wherein the processor is configured to cause the display to display the representation of the combined interest by overlaying the representation of the combined interest over the shared image data.

11. The apparatus of claim 10, wherein the processor is configured to cause the display to display the representation of the combined interest by overlaying the representation of the combined interest over a thumbnail image of the shared image data.

12. The apparatus of claim 8, wherein the message comprises coordinates defining an area of highest interest within the shared image data, and wherein the processor is further configured to cause the display to display the area of highest interest within the shared image data.

13. The apparatus of claim 12, wherein the processor is configured to cause the display to display the area of highest interest by causing the display to display a thumbnail image of the area of highest interest.

14. The apparatus of claim 8, wherein the processor is further configured to receive, via the network interface unit, a command to zoom to an area of highest interest within the shared image data, and cause the display to display the portion of the shared image data that matches the area of highest interest.

15. An apparatus comprising:
a network interface unit configured to communicate data in an online conference session among a plurality of attendee devices and a presenter device;
a display configured to display image data from the presenter device in the online conference session; and
a processor configured to:
join the online conference session as the presenter device;
cause the network interface unit to share the image data with the plurality of attendee devices in the online conference session;
receive during the online conference session, via the network interface unit, a message representing a combined interest in at least one area of the shared image data that is currently shared with the plurality of attendee devices, wherein the combined interest is generated based on respective interests comprising respective portions of the shared image data currently displayed at each respective attendee device of the plurality of attendee devices; and
cause the display to display a representation of the combined interest during the online conference session.

16. The apparatus of claim 15, wherein the processor is configured to cause the display to display the representation of the combined interest by displaying a heat map of pixels in the shared image data that represents a number of attendee devices displaying each of the pixels in the shared image data.

17. The apparatus of claim 16, wherein the processor is configured to cause the display to display the heat map by overlaying the heat map on the image data.

18. The apparatus of claim 16, wherein the processor is configured to cause the display to display the heat map by causing the display to show a thumbnail image of the heat map.

19. The apparatus of claim 15, wherein the online conference session is mediated by a meeting server, and the network interface unit is configured to receive the message representing interest in areas of the shared image data from the meeting server.

20. The apparatus of claim 15, wherein the processor is further configured to cause the network interface unit to transmit a command to the plurality of attendee devices, the command directing the attendee devices to display an area of highest interest in the shared image data.

* * * * *